US010924504B2

(12) United States Patent
Gusat et al.

(10) Patent No.: US 10,924,504 B2
(45) Date of Patent: Feb. 16, 2021

(54) DUAL-PORT MIRRORING SYSTEM FOR ANALYZING NON-STATIONARY DATA IN A NETWORK

(71) Applicant: International Business Machines Corporation, Armonk, NY (US)

(72) Inventors: Mircea R. Gusat, Langnau a.A. (CH); Andreea Anghel, Adliswil (CH); Georgios Kathareios, Zurich (CH); Akos Mate, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 16/028,490

(22) Filed: Jul. 6, 2018

(65) Prior Publication Data

US 2020/0014712 A1    Jan. 9, 2020

(51) Int. Cl.
*H04L 29/06* (2006.01)
*H04L 12/931* (2013.01)
*H04L 12/26* (2006.01)
*H04L 12/24* (2006.01)
*G06N 20/00* (2019.01)

(52) U.S. Cl.
CPC ......... *H04L 63/1425* (2013.01); *G06N 20/00* (2019.01); *H04L 41/0816* (2013.01); *H04L 41/16* (2013.01); *H04L 43/026* (2013.01); *H04L 43/028* (2013.01); *H04L 43/04* (2013.01); *H04L 43/12* (2013.01); *H04L 49/208* (2013.01); *H04L 63/101* (2013.01)

(58) Field of Classification Search
CPC . H04L 63/1425; H04L 41/0816; H04L 41/16; H04L 43/026; H04L 43/028; H04L 43/04; H04L 43/12; H04L 49/208; H04L 63/101; G06N 20/00
See application file for complete search history.

(56) References Cited

U.S. PATENT DOCUMENTS 9,300,554 B1 *  3/2016  Kosai ............... G06F 16/24578
9,712,419 B2    7/2017  Matityahu et al.
(Continued)

OTHER PUBLICATIONS

Zhu, Y., et al., "Packet-Level Telemetry in Large Datacenter Networks", SIGCOMM '15, Aug. 17-21, 2015, Downloaded from https://www.microsoft.com/en-us/research/publication/packet-level-telemetry-in-large-datacenter-networks/ on Jul. 3, 2018, 13 pages.
(Continued)

*Primary Examiner* — Oleg Korsak
(74) *Attorney, Agent, or Firm* — Scully, Scott, Murphy & Presser, P C.; Daniel P. Morris.

(57) ABSTRACT

Distinct sets of non-stationary data seen on a switch in data communication with one or more of computerized units in a network, are mirrored via two switch ports, which include a first port and a second port. A dual analysis is performed while mirroring said distinct sets of data. First data obtained from data mirrored at the first port are analyzed (e.g., using a trained machine learning model) and, based on the first data analyzed, the switch is reconfigured for the second port to mirror second data, which are selected from non-stationary data as seen on the switch (e.g., data received and/or transmitted by the switch). The second data mirrored at the second port is analyzed (e.g., using a different analysis scheme, suited for the selected data).

20 Claims, 3 Drawing Sheets

(56) References Cited

U.S. PATENT DOCUMENTS

| | | | | |
|---|---|---|---|---|
| 10,063,434 | B1* | 8/2018 | Khanal | G06N 20/00 |
| 10,264,003 | B1* | 4/2019 | Wu | H04L 41/0681 |
| 10,382,296 | B2* | 8/2019 | Khanal | H04L 43/08 |
| 2007/0192863 | A1* | 8/2007 | Kapoor | H04L 67/10 |
| | | | | 726/23 |
| 2008/0262990 | A1* | 10/2008 | Kapoor | H04L 63/1408 |
| | | | | 706/20 |
| 2011/0238855 | A1* | 9/2011 | Korsunsky | G06F 21/56 |
| | | | | 709/231 |
| 2012/0240185 | A1* | 9/2012 | Kapoor | H04L 41/0866 |
| | | | | 726/1 |
| 2014/0149569 | A1* | 5/2014 | Wittenstein | H04L 43/12 |
| | | | | 709/224 |
| 2014/0280887 | A1 | 9/2014 | Kjendal et al. | |
| 2015/0113132 | A1* | 4/2015 | Srinivas | H04L 41/147 |
| | | | | 709/224 |
| 2017/0054854 | A1 | 2/2017 | Richards et al. | |

OTHER PUBLICATIONS

Rasley, J., et al. "Planck: Millisecond-scale Monitoring and Control for Commodity Networks", SIGCOMM '14, Aug. 17-22, 2014, 12 pages.

* cited by examiner

DUAL-PORT MIRRORING SYSTEM FOR ANALYZING NON-STATIONARY DATA IN A NETWORK

BACKGROUND

The present disclosure relates in general to the field of methods and systems for analyzing non-stationary data in a network of computerized units, as well as to related computer-program products. In particular, it is directed to a machine-learning-driven traffic mirroring system.

There is a need to efficiently detect anomalies in network traffic, in particular in datacenter networks. Two prevalent approaches in designing anomaly detection systems are known, which are based on signatures or behaviors of the data traffic.

Signature-based detection relies on the existence of a collection of known attack signatures that gets updated every time a new attack is found. The detection is performed by checking whether the signature of suspicious traffic matches a signature in the available collection. Behavioral detection may be useful in defending against novel malicious behaviors, for which signatures are not available yet. This detection typically relies on machine learning to create profiles for behaviors of the normal network traffic. The profiles are used to detect anomalies, i.e., traffic having a behavior that diverges significantly from a norm. A merit of this approach is that it can operate without prior knowledge or traffic assumptions, often being unsupervised in nature.

In both cases, the network data traffic need be monitored. However, due to the high speed and capacity of modern links and switches, the amount of data actually monitored typically represents only a small subset of the full traffic of the network. Thus, only a low-resolution (or coarse-grained) view is available, which impairs the ability of the system to detect threats in acceptable times.

SUMMARY

According to a first aspect, the present invention is embodied as a method of analyzing non-stationary data in a network. The network is assumed to comprise several computerized units, which communicate data throughout the network. A given switch is assumed to be in data communication with one or more of said computerized units and can thus be regarded as forming part of the network. The present method relies on analyzing data obtained by mirroring data received and/or transmitted by a given switch. In more detail, distinct sets of non-stationary data seen on said switch are mirrored via two switch ports, which include a first port and a second port. Then, a dual analysis is performed while mirroring said distinct sets of data. Namely, first data obtained from data mirrored at the first port are analyzed and, based on the first data analyzed, the switch is reconfigured for the second port to mirror second data, which are selected from non-stationary data as seen on the switch (i.e., data received and/or transmitted by the switch). The second data mirrored at the second port is analyzed too. Still, the first and said second data are analyzed using distinct analysis schemes, including a first analysis scheme for analyzing said first data and a second analysis scheme for analyzing said second data.

Of particular interest is to implement a trained machine-learning model (as part of said first analysis scheme), in order to analyze said first data, as in embodiments. That is, the machine-learning model is run to identify specific data characteristics (e.g., anomalous data) from the first data analyzed. The switch can accordingly be reconfigured for the second port to selectively mirror said second data based on the specific data characteristics identified thanks to the trained model.

According to another aspect, the invention is embodied as a dual-port mirroring system for analyzing non-stationary data in a network of computerized units. This system basically comprises a switch, an observing entity, and a data analyzer. The switch is generally configured to enable data communication with one or more of the computerized units of the network. The observing entity is connected to two ports, including a first port and a second port, wherein the two ports are configured, together with the switch, to mirror distinct sets of data received and/or transmitted by the switch. The data analyzer, which is in data communication with the observing entity, is designed to take specific actions while data is being mirrored at the two ports, consistently with the above method. Namely, the analyzer is configured to analyze first data obtained from data mirrored at the first port; reconfigure the switch (based on the first data analyzed) for the second port to mirror second data selected from data received and/or transmitted by the switch; and analyze the second data mirrored at the second port.

According to another aspect, the invention is embodied as a computer program product, wherein the computer program product comprises a computer readable storage medium having program instructions embodied therewith. The program instructions are executable by one or more processors to cause to implement steps according to the method described above.

Computerized systems, methods, and computer program products embodying the present invention will now be described, by way of non-limiting examples, and in reference to the accompanying drawings.

BRIEF DESCRIPTION OF SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

The accompanying drawings show simplified representations of devices or parts thereof, as involved in embodiments. Similar or functionally similar elements in the figures have been allocated the same numeral references, unless otherwise indicated.

DETAILED DESCRIPTION OF EMBODIMENTS OF THE INVENTION

The following description is structured as follows. First, general embodiments and high-level variants are described (sect. 1). The next section addresses more specific embodiments and technical implementation details (sect. 2).

1. General Embodiments and High-Level Variants

In reference to FIGS. 1-4, an aspect of the invention in an embodiment is first described, which concerns a method of analyzing non-stationary data in a network 2 of computerized units 11.

Non-stationary data are data flowing in the network 2, e.g., a cloud. That is, the data to be analyzed relates to moving data (i.e., data sent by nodes to other nodes of the network 2), as opposed to static data (e.g., data that is statically stored on resources of the network). Non-stationary data accordingly relates to data traffic, data communication and/or patterns of moving data. More generally, such data relates to dynamic events occurring in the network, this including network intrusions. The non-stationary data may for instance consists of encrypted data, e.g., end-to-end encoded or encapsulated data flows, streams, or time-series.

Figure 1:
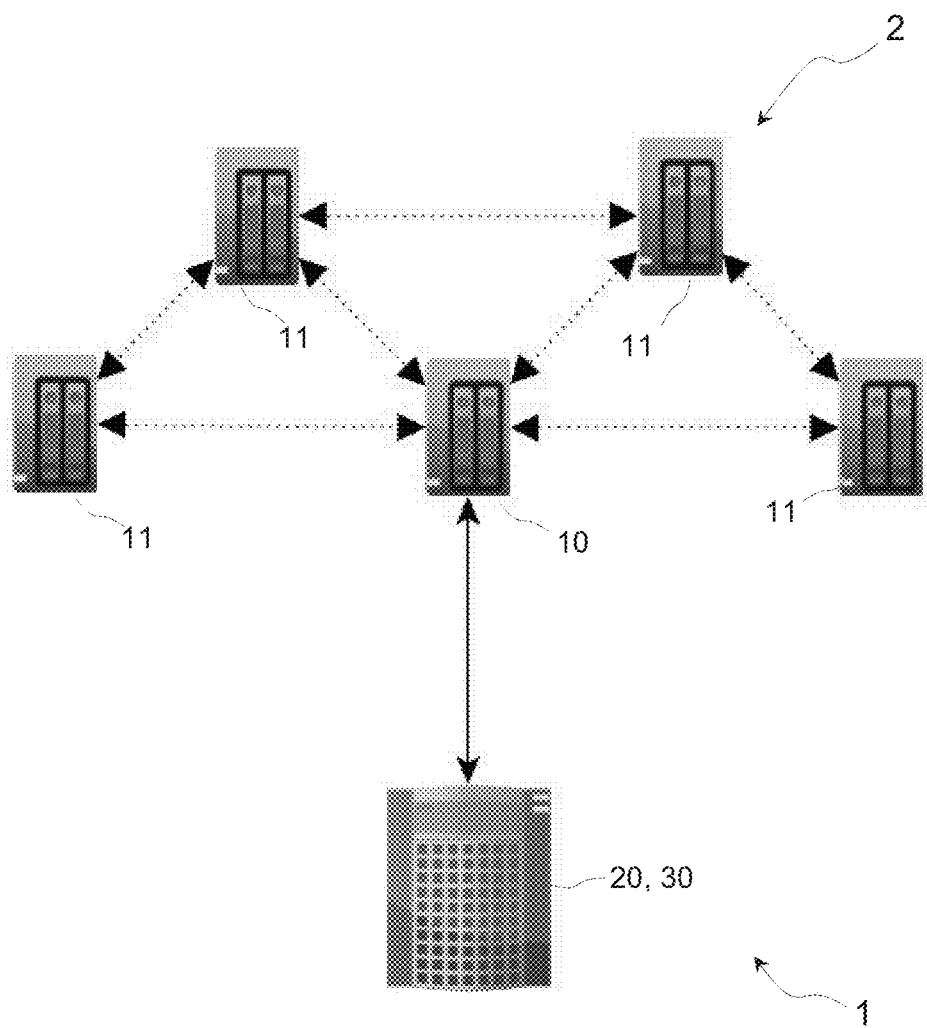
FIG. 1 schematically represents components (i.e., cloud resources and a network monitoring system) of a computerized network. The monitoring system is adapted to interact with cloud components for detecting anomalies in non-stationary data in the cloud, as in embodiments.

As depicted in FIG. 1, the network 2 further comprises a switch 10, used for data mirroring purposes. This switch is assumed to be in data communication with one or more of the computerized units 11. That is, the switch 10 is connected to one or more hosts 11 of the network 2, which forward and/or receive data to and/or from the switch 10, respectively, see S10 in the flowchart of FIG. 4. Note, each of the nodes 10, 11 is a computerized unit (i.e., a device), in data communication with other units 10, 11 of the network. The specific node 10, as relied on to implement steps of the present methods, is referred to as a switch, for the sake of distinction. And, subject to the dual-port mirroring enabled by the switch 10, as discussed below, this switch may otherwise be identical (or essentially similar, physically) to other nodes 11.

Figure 3:
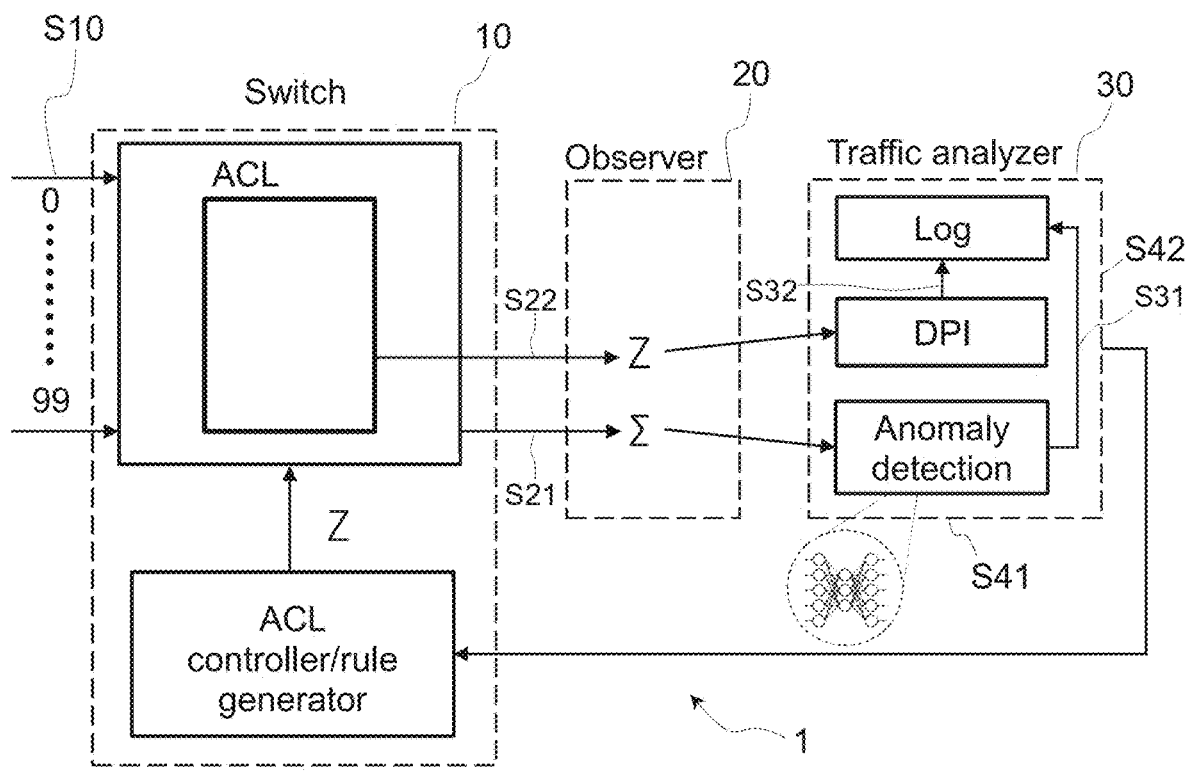
FIG. 3 is a block diagram schematically illustrating selected components (including a mirroring switch, an observer and a traffic analyzer) of a system architecture as in FIG. 2, and according to embodiments.

Non-stationary data seen S10 on the switch 10 (i.e., data received and/or transmitted by the switch 10) are actually mirrored S21, S22 via two, distinct switch ports, these including a first port Σ and a second port Z, see FIG. 3. The reason for using two distinct ports is that distinct sets of data (i.e., arising from distinct data flows) are mirrored via the two ports, for reasons explained below.

The data mirroring steps S21, S22 carried out via the ports Σ and Z are concurrently performed (i.e., concomitant). The mirroring enabled by the switch 10 is local. In that case, the ports Σ and Z may for instance be configured as output ports of the switch 10, in order to mirror incoming data packets. In variants, however, remote mirroring can be contemplated. That is, the two ports may be configured as remote ports of a destination switch (not shown), which is in data communication with the first switch 10. In order words, the target ports Σ and Z may possibly be ports of the target switch 10 or, in variants, ports of another switch. A variety of port architectures may actually be contemplated, depending on the mirroring scheme chosen, as the skilled person may appreciate.

A dual analysis S41, S42 is continually performed, concurrently to steps S10, S21 and S22, i.e., while mirroring S21, S22 the distinct data flows. That is, a first flow of data (hereafter "first data"), as obtained from data mirrored S21 at the first port Σ, is analyzed at step S41. The switch 10 may for instance send a copy of part or all of the network packets seen on one or more ports thereof (or an entire VLAN) to the first mirroring port Σ, for subsequent analysis S41. The analysis performed at step S41 may for instance be based on signatures or behaviors of the data traffic. The analysis may rely on behavioral detection, where a trained machine-learning model can be used for a systematic detection, as in embodiments discussed below. The data received, transmitted and then analyzed are typically network traffic data, e.g., aggregated data flows.

Then, based on the first data analyzed S41, the switch 10 is reconfigured S50-S55-S15 for the second port Z to mirror S22 selected data (hereafter "second data"). The second data represents a specific selection S15 from data received and/or transmitted S10 by the switch 10. Note, the second data does typically not amount to a selection made within the first data (i.e., as obtained from data mirrored S21 at the first port Σ). Rather, the second data is obtained by selectively mirroring data that is received and/or transmitted S10 by the switch 10, concurrently to step S21, it being reminded that steps S10, S21 and S22 are concomitant. This is exemplified later.

The second data as mirrored at the second port Z is analyzed S42. In other words, selected data is mirrored S22 at the second port Z based on outcomes of the first analysis S41 on data mirrored at the first port, to enable further (e.g., more fine-grained) analysis S42 of the selected data. Again, even if steps S50-S55-S15, which impact subsequent steps S42, are based on a previous analysis step S41, it remains that steps S41 and S42 are continually performed and are therefore concurrent steps, owing to the continual data flows received and/or sent at S10.

The present approach makes it possible to implement distinct analyses of distinct sets of data (obtained from distinct data flows) that are continually and concurrently mirrored S21, S22 at the two ports. For example, anomalous traffic detection may be implemented S41 based on a systematic (e.g., behavioral) analysis of data mirrored at the first port Σ, while a more fine-grained analysis (e.g., involving deep packet inspection) may be carried out in respect of data mirrored at the second port Z, as assumed in FIG. 3. The selected data mirrored S22 at the second port Z, which is normally much less voluminous than data mirrored at the first port Σ, may notably be subject to more extensive analyses, while systematic analyses may be performed on sampled data mirrored via the first port Σ. This, in turn, makes it possible to adapt the level of analyses to the amount of data mirrored at each port, to achieve finer detection of anomalous data traffic, such as network intrusions.

Based on outcomes of the analyses S41, S42, any appropriate safeguard actions may be taken S60, if necessary, e.g., to isolate or inhibit the source of anomalous data traffic, etc. Note, such safeguard actions are known per se; they are routinely implemented in large networks such as datacenter networks. Such actions are orthogonal to the core principles of the present invention in an embodiment, which primarily concerns the detection of events, which may precisely cause taking such actions. Note, safeguard actions are typically taken outside of the system 10-30. That is, anomalies detected at step S41 (and if necessary confirmed S42, e.g., thanks to a deeper inspection) may simply be logged S32 by the analyzer 30. Then, a third-party, having access to data logged by the system 10-30 may decides to take such action based on the data logged (e.g., including anomaly scores, possibly re-rated according to step S42).

As evoked above, said first and second data are analyzed S41, S42 using distinct analysis schemes. That is, a first analysis scheme (e.g., concerning global data, unbiased with respect to the senders/recipients 11, but sampled) may be implemented for analyzing S41 said first data, while a second analysis scheme (e.g., biased, potentially fully sampled, and implemented via a match-and-mirror approach) may be used for analyzing S42 said second data, as suggested in FIGS. 3, 4. In variants, similar analysis schemes may be performed at steps S41, S42, although the data packets involved may be differently sampled, for example.

Of particular advantage is to implement S41 a trained machine-learning model as part of said first analysis scheme, as suggested in FIG. 3. That is, an already trained model may be run at step S41, i.e., for inference purposes and, more precisely, to identify specific data characteristics from the first data analyzed. Accordingly, the switch 10 may subsequently be reconfigured S15 for the second port Z to selectively mirror S22 data based on the data characteristics identified. This way, unbiased (yet sampled) data may for instance be systematically analyzed at step S41, e.g., to determine anomalous data via a behavioral analysis.

The model used at step S41 may notably be a trained, unsupervised machine learning model, which allows an autonomous pre-selection (and ranking) of anomalies. This model may for example be implemented as an auto-encoder by a neural network, in which case the classification may advantageously be performed according to a reconstruction error of the auto-encoder. For instance, the unsupervised model may be a multi-layer perceptron model, yet implemented in a form of an auto-encoder.

Note that, in the literature, the terms "cognitive algorithm", "cognitive model", "machine learning model" or the like are interchangeably used. In an effort to clarify terminologies, one may tentatively adopt the following definition: a machine learning model is generated by a cognitive algorithm, which learns its parameter(s) from input data points, so as to arrive at a trained model. Thus, a distinction can be made between the cognitive algorithm being trained and the model that eventually results (called trained model or retrained model) upon completion of the training of the underlying algorithm.

The machine-learning model may notably have been trained during a previous cycle S41-S70. I.e., in order to address the network data variability, the method may further comprise training (or re-training) S65 a cognitive algorithm (while collecting and classifying collected data S31, S32), which algorithm corresponds to said inference model, to obtain a trained model. The training is based on collected S31, S32 data, which typically requires maintaining S31, S32 a history of non-stationary data in the network. Then, the inference model as currently used to classify S41 the non-stationary data may be substituted S70 by the trained model, e.g., upon detecting a substantial change in the parameter(s) learned by the algorithm. Next, non-stationary data can be further classified, during a subsequent step S41, based on the most recently substituted model, so as to be able to detect new anomalies in the network 2, and so on.

Figure 4:
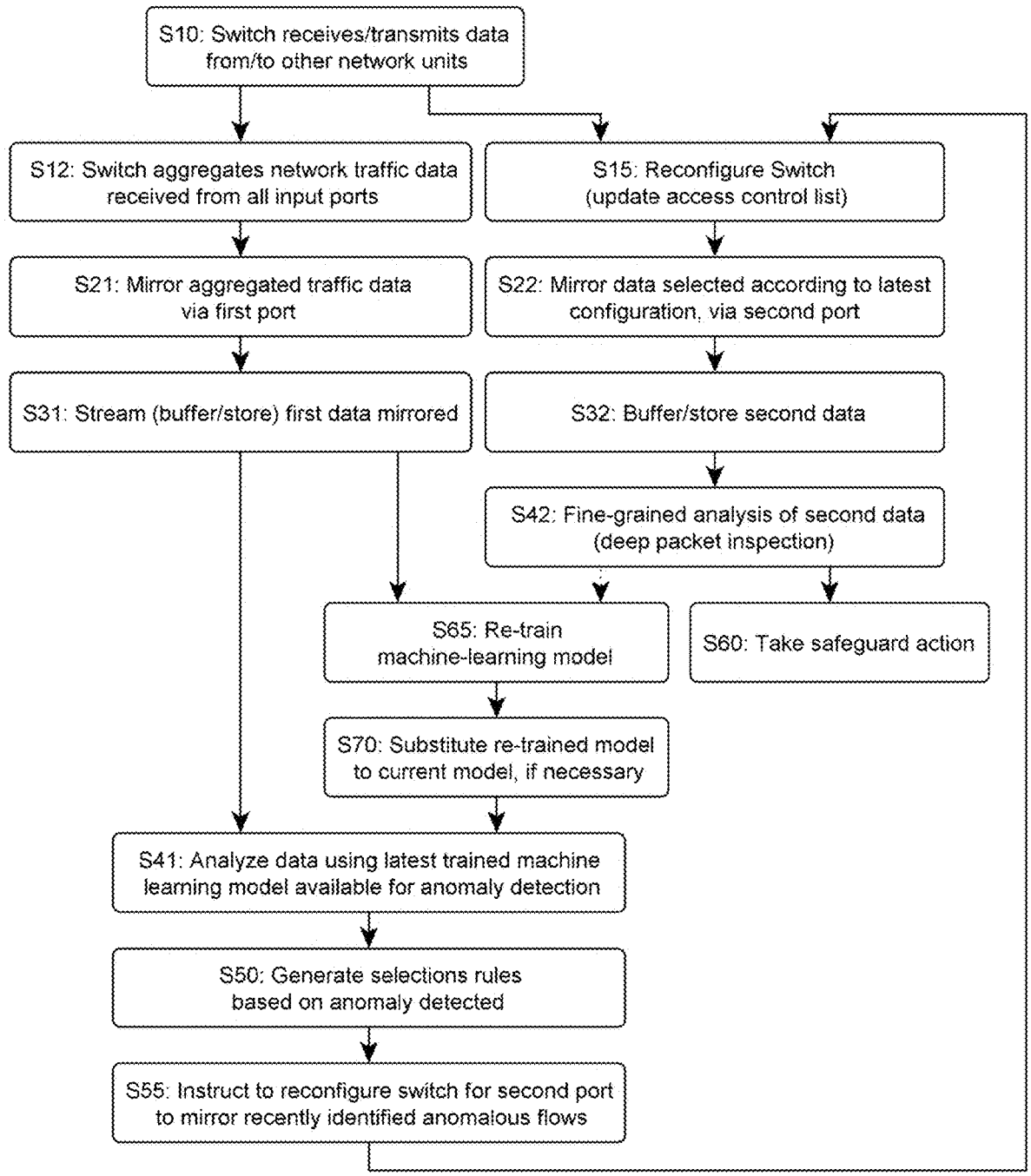
FIG. 4 is a flowchart illustrating high-level steps of a method of analyzing non-stationary data in a network, as in embodiments.

As evoked earlier, the data mirrored S21 at the first port Σ comprises network traffic data received S10 by the switch 10, e.g., from one or likely more units 11. As shown in FIG. 4, network traffic data can be aggregated at step S12, prior to mirroring S21 aggregated data at the first port Σ to obtain S31 said first data. The aggregated traffic data may for instance correspond to data received S10 from all input ports of the switch 10. Then, the data mirrored at step S21 may for instance be buffered, stored and logged S31 in view of the first type of analysis to be performed S41. Note, when the traffic of data mirrored at step S21 is low, then data mirrored can indeed easily be stored and logged, in view of step S41. However, the traffic will likely be too high to allow data to be stored and logged in large networks such as datacenter networks in practice. In such a case, the traffic is at most temporarily buffered and streamed to the analyzer for on-line analysis purposes S41. In addition, the same data can be, e.g., used by a machine learning model for learning purposes S65.

The detection performed at step S41 can be implemented as a stateful (also called memoryful) process, which tracks information about senders/receivers 11 of the non-stationary data collected at step S10. This is achieved by forming data points (e.g., in the form of vectors of n features each), where data points are formed by aggregating data related to data flows from respective sources 11 and for given time periods. More generally, a data point can be regarded as any dataset suitable for use by a machine learning model, as proposed in embodiments discussed above.

Of particular interest is that the classification S41 is performed online, i.e., while collecting S10 and mirroring S21 the first data. E.g., each data point formed upon collecting new data can be directly analyzed online (i.e., on-the-fly), by the inference model, which allows processing speed. As evoked earlier, a particularly advantageous way of analyzing online data points is to score anomalies based on a reconstruction error of the inference model, as the latter reconstructs data points it ingests on-the-fly.

Eventually, anomalies can be detected S41 from the non-stationary data collected S10 and then classified S41 according to a stateful process. Anomalies in the non-stationary data may generally relate to traffic anomaly, such as network attacks on the business environment, unauthorized accesses, network intrusions, improper data disclosures or data leakages, system malfunctions or data and/or resources deletion, etc.

The present approach can further be made versatile, so as to near-exhaustively detect anomalies in near real time (e.g., at speeds of 10-100 Gbps). In particular, the network data variability can be addressed by implementing an efficient anomaly detection pipeline, designed to adapt to sudden changes in traffic behavior (through online learning) and retain memory of past behaviors, in contrast to prevailing Markovian approaches.

Now, as not all anomalies detected S41 by the unsupervised model may constitute malicious behaviors, whence the second stage of analysis S42 implemented on the second (selected) data. For example, the machine-learning model may be trained to identify S41 anomalous sources of network traffic from network traffic data mirrored S21 via the first port. This way, the switch 10 can subsequently be reconfigured S50-S55-S15 for the second port Z to selectively mirror S42 data received S10 (by the switch 10) from the anomalous sources identified at step S41. There, the second analysis S42 may for instance involve a deep packet inspection of data packets selected according to the latest selection configuration available S15.

In embodiments, the reconfiguration S50-S55-S15 of the switch 10 causes to generate S50 selections rules, based on the first data analyzed S41. Accordingly, the switch 10 is led to select S12 the second data to be mirrored at the second port Z according to one or more of the generated rules S50. Step S50 may notably cause to generate or update an access control list (ACL), which can, in turn, be used by the switch to match and mirror data received S10 at the switch 10. I.e., selected data are mirrored at the second port Z based on traffic matching rules defined by the ACL, as in match-and-mirror approaches. Access control lists and match-and-mirror methods are known per se.

Figure 2:
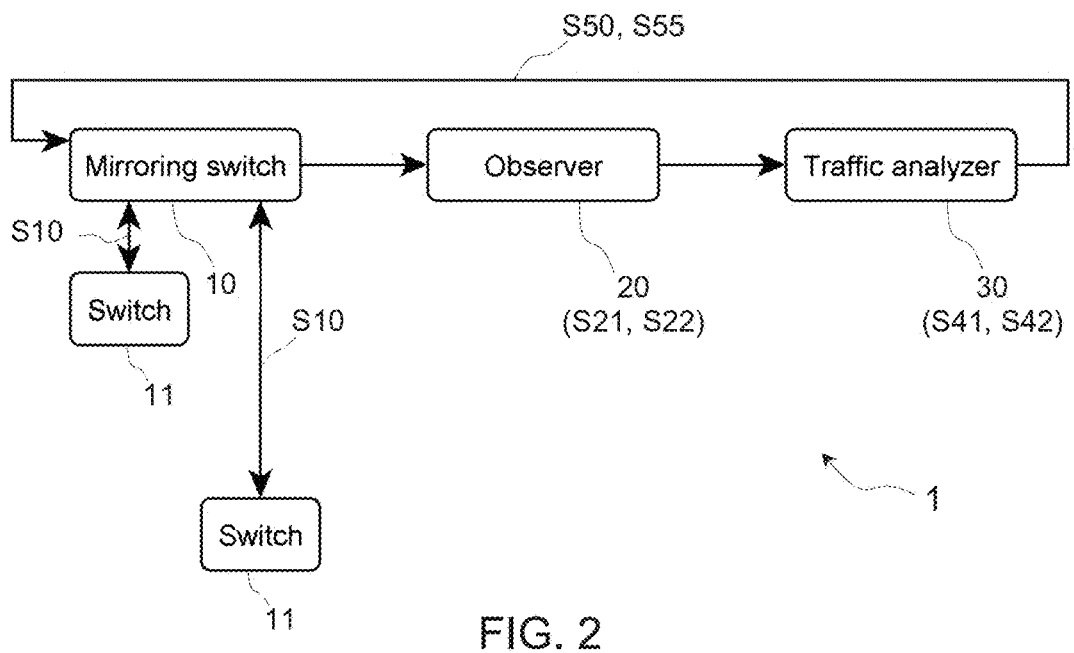
FIG. 2 is a high-level diagram of a system architecture according to embodiments.

Referring to FIGS. 1-3, another aspect of the invention is now described, which concerns a dual-port mirroring system 1 for analyzing non-stationary data in a network 2 of computerized units 11. Main aspects 10-30 of the system 1 have implicitly been described in reference to the present methods. They are thus only briefly described in the following.

The system 1 essentially comprises a switch 10, an observing entity 20 (or observer), and a data analyzer 30 (or traffic analyzer). The switch 10 is generally configured to enable data communication with one or more of the computerized units 11 of the network 2, as discussed earlier. The observing entity 20 is connected to two ports Σ and Z, which together with the switch form a dual-port system, capable of mirroring distinct sets of data (data flows) received and/or transmitted by the switch 10. Said ports can be dedicated mirror ports or regular output ports (e.g., with low traffic), for example; they are configured as local output ports of the switch 10, though remote mirroring is possible, in which case the observing entity 20 connects to ports of a remote switch, as noted earlier. Note, in FIGS. 2 and 3, the observer 20 is shown to encompass the ports Σ and Z and appears to be distinct from the switch 10, for the sake of depiction. Similarly, the analyzer 30 is depicted as a distinct entity. Still, both entities 20, 30 could possibly be implemented at the switch 10, or at a distinct unit, as suggested in FIG. 1.

The data analyzer 30 is in data communication with the observing entity 20. Consistently with the present methods, the analyzer 30 is generally configured to analyze S41 first data obtained from data mirrored at the first port Σ and reconfigure S50, S55 the switch 10 for the second port Z to mirror selected data, as explained earlier. Additional analysis is performed S42 on data mirrored at the second port Z.

As already explained earlier in reference to FIGS. 3, 4, the system 1 is designed to implement distinct analysis schemes S41, S42. The data analyzer 30 may notably implements a trained machine-learning model to identify specific data characteristics (e.g., anomalous data traffic) from the first data analyzed S41, which triggers a reconfiguration S50-S55-S15 of the switch 10, in operation. In turn, additional analyses (e.g., deep packet inspection) can be performed on the selected data.

The observer 20 and analyzer 30 may for instance be implemented as computerized modules executed on a same machine (as suggested in FIG. 1). In variants, they may be executed in a delocalized fashion, through various nodes 10, 11 of the network 2. Again, various architectures can be contemplated, as the one skilled in the art will appreciate.

Next, according to another aspect, the invention can also be embodied as a computer program product. This computer program product comprises a computer readable storage medium having program instructions embodied therewith, wherein the program instructions are executable by one or more processors, to cause to take steps according to the present methods. Aspects of this computer program product are discussed in detail in sect. 2. This program may for instance be run at specific nodes 10, 11 of the network 2 (in a more or less delocalized way) or at a dedicated entity 20, 30 (as assumed in FIG. 1). Here also, various software architectures can be contemplated.

The above embodiments have been succinctly described in reference to the accompanying drawings and may accommodate a number of variants. Several combinations of the above features may be contemplated (examples are given in the next section). In addition, many other variants than explicitly touched above can be envisioned. For example, in further embodiments, a set of traffic monitoring sensors may be relied on, which interact with cloud resources (nodes, network switches, network monitoring entities, etc.), as necessary to monitor the non-stationary data.

An embodiment is directed to a method of analyzing non-stationary data in a network. The network is assumed to comprise several computerized units, which communicate data throughout the network. A given switch is assumed to be in data communication with one or more of said computerized units and can thus be regarded as forming part of the network. The present method relies on analyzing data obtained by mirroring data received and/or transmitted by a given switch. In more detail, distinct sets of non-stationary data seen on said switch are mirrored via two switch ports, which include a first port and a second port. Then, a dual analysis is performed while mirroring said distinct sets of data. Namely, first data obtained from data mirrored at the first port are analyzed (e.g., using a trained machine learning model) and, based on the first data analyzed, the switch is reconfigured for the second port to mirror second data, which are selected from non-stationary data as seen on the switch (i.e., data received and/or transmitted by the switch). The second data mirrored at the second port is analyzed too (e.g., using a different analysis scheme, suited for the selected data). Related systems and computer program products are also disclosed.

2. Specific Embodiments—Technical Implementation Details 2.1 Detailed Example of an Embodiment An embodiment relies on a switch dual-port mirroring system with control loop driven by a machine learning (ML) engine. The ML engine is applied on aggregated traffic mirrored from all the input ports of the switch 10. The output of the ML engine triggers changes in the configuration of the second mirroring port Z. The latter filters S42 only the traffic belonging to a set of anomalous (or other "interesting") sources as identified S41 by the ML engine. This scheme allows a more fine-grained/targeted traffic monitoring system.

In more detail, one or more output (local) ports of the switch 10 are assigned as mirror ports Σ, Z, which altogether constitute the observer 20 of the system 1. The observer 20 selects through a closed control loop the amount and nature of data to be mirrored at the second port Z.

Given that the observer 20 has a certain capacity, which cannot exceed the capacity of the mirror ports, the selection ensures that the mirrored data does not surpass the capacity of the second port. In detail, the available bandwidth/capacity of the observer 20 decomposes into: (i) a data flow Σ with slowly varying characteristics, consisting of a limited amount of (sampled) data from every input switch port 0-99 (see FIG. 3); and (ii) a time-varying flow Z of mirrored packets, the nature and scope of which is decided though the control loop.

Two monitoring data streams are involved. The first one is global to the switch, unbiased, which involves sampled data. The second is biased, potentially fully sampled, and implemented via ML-driven match-and-mirror. The traffic through the first port Σ is used for general anomaly detection, the result of which is used to reconfigure the Σ traffic. The traffic through the second port Z is used for applications that require a more fine-grained view of the traffic.

2.2 Clouds

It is to be understood that although this disclosure refers to embodiments involving cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

2.3 Systems, Methods and Computer Program Products

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A method of analyzing non-stationary data in a network of computerized units, wherein the network further comprises a switch in data communication with one or more of said computerized units, wherein the method comprises:
   aggregating, by the switch, data received via input ports of the switch;
   mirroring distinct sets of the data via two switch ports that comprise a first port and a second port, the first port mirroring the aggregated data and the second port mirroring the data selectively according to the second port's latest configuration, the mirroring via the first port and via the second port being performed concurrently; and
   while mirroring said distinct sets of the data:
      analyzing first data obtained from data mirrored at the first port;
      based on the first data analyzed, reconfiguring the switch for the second port to mirror second data selected from data communicated via the switch; and
      analyzing the second data mirrored at the second port.

2. The method according to claim 1, wherein said first data and said second data are analyzed using distinct analysis schemes, the latter including a first analysis scheme for analyzing said first data and a second analysis scheme for analyzing said second data.

3. The method according to claim 2, wherein analyzing said first data comprises implementing a trained machine-learning model as part of said first analysis scheme, wherein said machine-learning model is run to identify specific data characteristics from the first data analyzed, whereby, at reconfiguring the switch, the switch is reconfigured for the second port to selectively mirror said second data based on the specific data characteristics identified.

4. The method according to claim 3, wherein data mirrored at the first port comprises network traffic data received by the switch.

5. The method according to claim 4, wherein the aggregating comprises aggregating network traffic data, which are then mirrored at the first port to obtain said first data.

6. The method according to claim 5, wherein aggregating network traffic data comprises aggregating network traffic data received from all input ports of the switch.

7. The method according to claim 5, wherein said machine-learning model is trained to identify anomalous sources of network traffic from said network traffic data, whereby, at reconfiguring the switch, the switch is reconfigured for the second port to selectively mirror data received by the switch from the anomalous sources identified, as said second data.

8. The method according to claim 7, wherein analyzing said second data comprises implementing a deep packet inspection of data packets in said second data, as part of said second analysis scheme.

9. The method according to claim 1, wherein reconfiguring the switch comprises generating selections rules based on the first data analyzed, for the switch to select said second data to be mirrored at the second port according to one or more of the generated rules.

10. The method according to claim 9, wherein generating said selections rules comprises generating an access control list to match and mirror said second data.

11. A dual-port mirroring system for analyzing non-stationary data in a network of computerized units, the system comprising:
   a switch, configured to enable data communication with one or more of the computerized units of the network;
   an observing entity, connected to two ports, comprising a first port and a second port, wherein the two ports are configured, together with the switch, to mirror distinct sets of data communicated via the switch, the first port mirroring aggregated data received via input ports of the switch, and the second port mirroring the data selectively according to the second port's latest configuration, wherein the first port and the second port are configured to mirror the distinct sets of data concurrently; and
   a data analyzer, in data communication with the observing entity and configured to:
      analyze first data obtained from data mirrored at the first port;
      based on the first data analyzed, reconfigure the switch for the second port to mirror second data selected from data communicated via the switch; and
      analyze the second data mirrored at the second port.

12. The system according to claim 11, wherein the data analyzer is further configured to implement distinct analysis schemes, including a first analysis scheme for analyzing said first data and a second analysis scheme for analyzing said second data.

13. The system according to claim 12, wherein the data analyzer is configured to implement a trained machine-learning model as part of said first analysis scheme, whereby:
   said machine-learning model is run to identify specific data characteristics from the first data analyzed; and
   the data analyzer is adapted to reconfigure the switch for the second port to selectively mirror said second data based on the specific data characteristics identified, in operation.

14. The system according to claim 13, wherein the first port is configured, together with the switch, to mirror network traffic data received by the switch, said first data comprising said network traffic data, in operation.

15. The system according to claim 13, wherein
said machine-learning model is trained to identify anomalous sources of network traffic from said network traffic data, whereby the data analyzer is adapted to reconfigure the switch for the second port to selectively mirror data received by the switch from the anomalous sources identified, as said second data, in operation.

16. The system according to claim 15, wherein
the data analyzer is further configured to implement a deep packet inspection as part of said second analysis scheme.

17. The system according to claim 11, wherein
the data analyzer is further configured to generate selections rules based on the first data analyzed, for the switch to select said second data to be mirrored at the second port based on traffic matching one or more of the generated rules.

18. The system according to claim 11, wherein
said two ports are configured as output ports of said switch.

19. A computer program product for analyzing non-stationary data in a network of computerized units, wherein the network further comprises:
a switch in data communication with one or more of said computerized units; and
an observing entity, connected to two ports, comprising a first port and a second port, wherein the two ports are configured, together with the switch, to mirror distinct sets of data communicated via the switch, the first port mirroring aggregated data received via input ports of the switch, and the second port mirroring the data selectively according to the second port's latest configuration, wherein the first port and the second port are configured to mirror the distinct sets of data concurrently,
and wherein the computer program product comprises
a computer readable storage medium having program instructions embodied therewith, the program instructions executable by one or more processors, to cause, while mirroring said distinct sets of data, to:
analyze first data obtained from data mirrored at the first port;
based on the first data analyzed, reconfigure the switch for the second port to mirror second data selected from data communicated via the switch; and
analyze the second data mirrored at the second port.

20. The computer program product according to claim 19, wherein
said program instructions are further executable for said first data and said second data to be analyzed using distinct analysis schemes, the latter including a first analysis scheme for analyzing said first data and a second analysis scheme for analyzing said second data, wherein analyzing said first data comprises implementing a machine-learning model as part of said first analysis scheme, wherein said machine-learning model is trained to identify specific data characteristics from the first data analyzed, whereby, upon reconfiguring the switch, the switch is reconfigured for the second port to selectively mirror said second data based on the specific data characteristics identified.

* * * * *